United States Patent
Liu et al.

(10) Patent No.: US 9,614,391 B2
(45) Date of Patent: Apr. 4, 2017

(54) ACTIVE CHARGE EQUILIBRIUM SYSTEM FOR LITHIUM BATTERY PACK

(71) Applicants: Peide Liu, Shenzhen (CN); Darui Wang, Shenzhen (CN); Baozhong Liu, Shenzhen (CN); Zhixian Zhang, Shenzhen (CN); Zhefeng Su, Shenzhen (CN)

(72) Inventors: Peide Liu, Shenzhen (CN); Darui Wang, Shenzhen (CN); Baozhong Liu, Shenzhen (CN); Zhixian Zhang, Shenzhen (CN); Zhefeng Su, Shenzhen (CN)

( * ) Notice: Subject to any disclaimer, the term of this patent is extended or adjusted under 35 U.S.C. 154(b) by 0 days.

(21) Appl. No.: 14/089,037

(22) Filed: Nov. 25, 2013

(65) Prior Publication Data
US 2014/0292265 A1    Oct. 2, 2014

(51) Int. Cl.
H02J 7/00 (2006.01)
H02J 7/02 (2016.01)

(52) U.S. Cl.
CPC .................................. *H02J 7/025* (2013.01)

(58) Field of Classification Search
USPC ........................................................ 320/108
See application file for complete search history.

(56) References Cited

U.S. PATENT DOCUMENTS

| | | | |
|---|---|---|---|
| 2007/0007822 A1* | 1/2007 | Cioaca et al. | 307/29 |
| 2007/0257639 A1* | 11/2007 | D'Arrigo et al. | 320/128 |
| 2008/0197805 A1* | 8/2008 | Pellenc | 320/116 |
| 2009/0039830 A1* | 2/2009 | Pellenc | 320/116 |

FOREIGN PATENT DOCUMENTS

| | | |
|---|---|---|
| CN | 02127989.6 | 4/2003 |
| CN | 200610157109.1 | 6/2008 |
| CN | 200820133032.9 | 5/2009 |

\* cited by examiner

*Primary Examiner* — Mohammed Alam

(57) ABSTRACT

An active charge equilibrium system for lithium battery pack consists a lithium battery pack composed of connecting multiple cells in series, including a multiplex module, control module and multiple equilibrium control module, which each segment of the cells are connected to the multiplex module in sequence, a voltage signal is converted into a digital signal via the control module to compare the voltages of the cells and select the cell with lower voltage. Further, the control module enables the equilibrium control module corresponding to the cell with the lower voltage to work. A pulse width modulator adjusts the output pulse width according to output current and voltage signal from a signal feedback module for controlling current and voltage to charge the cell. As the voltage of the cell reaches a constant current first and a constant voltage second, the control module turns off said equilibrium control module.

3 Claims, 3 Drawing Sheets

ACTIVE CHARGE EQUILIBRIUM SYSTEM FOR LITHIUM BATTERY PACK

FIELD OF THE INVENTION

The creation relates to an active charge equilibrium system for a lithium battery pack, particularly by using NMOS switch in place of conventional relay to control the charging of a single battery. NMOS switch has the advantages of low power consumption, low cost and long service life, and can reduce production cost effectively.

DESCRIPTION OF THE PRIOR ART

The voltage and capacity of a single battery cannot satisfy the practical requirement. Multiple batteries are always connected in series for use in an electric vehicle, in which there are several hundreds of segments of lithium cells. The loop life of a single lithium battery usually achieves several thousand times. However, a series battery pack is not easy to reach the standard because incompliance between lithium batteries. When batteries are used in series, the charging efficiency and discharging capability etc. will also be impacted. For current battery manufacturing technology, especially lithium battery manufacturing technology, it is difficult to achieve good compliance. Therefore, it is very necessary for the series battery pack to perform equilibrium process for the improvement of battery pack performance and the extension of battery pack service life.

The energy consumed method utilizes parallel resistors for branch current equilibrium such that excessive energy is consumed through resistor to branch current. In charging, with the voltage detection of the single battery, as a certain segment of single cells achieves the upper bound of voltage, the switch of the resistor equilibrium device in parallel therewith is conducted such that said segment of batteries and the resistor form a discharging path to convert excessive energy on the resistor into heat to prevent over charging of said segment of batteries, while incompletely charged batteries keep on chagrining. This method will introduce energy loss, large heating, low efficiency, and is not suitable for battery pack with large capacity or battery pack with larger difference between batteries.

In a non energy consumed equilibrium method, capacitors and inductors are used as intermediate energy storage elements to transfer charges on single batteries. In practical application, this method does not have high electric energy transfer efficiency and is not suitable for battery pack with segments of heavy series of batteries. Besides, capacitors and inductors are non linear devices with no proportion between current and voltage in energy storage process, especially for capacitor that has larger impact on the life of selection switch. This method suffers from shortages of low interference resistance, difficult control and high cost.

For example, Chinese patent No. 200820133032.9 has laid opened an equilibrium management system for a series battery pack, in which the constantly opened contacts of a dual-end relay are connected to the two ends of a single power source, the constantly closed end is connected with the constantly closed end of the adjacent relay, and the control end is connected with the selection circuit. The shortages of this method is that as the contact sticking situation occurs due to the degradation of relay, a severe problem occurs due to short of the single battery when another set of relays is selected.

For example, the Chinese patent No. 02127989.6 has laid opened a method that perform separating charging equilibrium for rechargeable battery. Incomplete charged batteries are charged through the switching of relays until all segments of batteries are charged completely. There are some shortages for this method, the first is low charging efficiency; the second is high cost, especially when large current is used for charging, the relay with large current is more expensive, and the system life is lower; the third is lower safety, among so many relays, once there are two relays suffer from failures (such as electrical shock sticking), the serial batteries are concurrently paralleled to cause battery to have accidents such as short, fire, explosion, having larger safety consideration.

For example, the Chinese patent No. 200610157109.1 discloses a voltage equilibrium management device for a power battery pack. In the system, the batteries with highest and lowest voltages are selected, respectively, through a chagrining selection module and a discharging selection module, between which an isolation DC-DC module is used for connection. In chagrining, the energy is moved from the battery with higher voltage to the battery with lower voltage such that the voltages of all batteries are compliant finally.

Charging selection and discharging selection modules have to be controlled concurrently in the circuit system for this method such that the control is more complex and the cost is higher. As any selection switch in the system is failure, the battery may suffer from the risk of short. The safety is lower, and the potential risk introduced by using relay as selection switch is not solved, either. It will recue largely the stability and reliability of the equilibrium system.

SUMMARY OF THE INVENTION

The energy consumed method utilizes parallel resistors for branch current equilibrium such that excessive energy is consumed through resistor to branch current. In charging, with the voltage detection of the single battery, as a certain segment of single cells achieves the upper bound of voltage, the switch of the resistor equilibrium device in parallel therewith is conducted such that said segment of batteries and the resistor form a discharging path to convert excessive energy on the resistor into heat to prevent over charging of said segment of batteries, while incompletely charged batteries keep on chagrining. This method will introduce energy loss, large heating, low efficiency, and is not suitable for battery pack with large capacity or battery pack with larger difference between batteries.

An active charge equilibrium system for lithium battery pack disclosed according to the creation is connected electrically to at least one lithium battery pack, which is composed of multiple cells in series, and the active charge equilibrium system of lithium battery pack includes a multiplex module, a control module and multiple equilibrium control modules. It connects each segment of cells in the lithium battery pack to the multiplex module in sequence, converts the voltage signal into a digital signal through the control module, and compare voltages of all cells to select the cell with lower voltage and enable the equilibrium control module corresponding to the cell with lower voltage to work through the control module for a pulse width modulator to adjust an output pulse width according to output current and voltage signals from a signal feedback module such that the output current and voltage are controlled to perform charging, and the charging to cell follows the sequence of constant current first and constant voltage last to proceed; as the voltage of the cell reaches a certain value, the control module turns off said equilibrium control module.

The detailed features and advantages of the creation is described in detail in the following embodiments, which contents are sufficient for those skilled in the art to understand the technical contents of the creation for realization. Also, any person skilled in the art may easily understand the purposes and advantages of the creation according to the disclosed content, claims and drawings.

DETAILED DESCRIPTION OF THE PREFERRED EMBODIMENTS

Fro the examiner to understand conveniently other features, contents and advantages of the creation and for its function to be manifested with respect to achievable effects, the creation will be described in detail for its features and advantages in conjunction of attached drawings. The following embodiments are used to further describe the viewpoints of the new model without limiting the scope of the new model with any viewpoint.

Figure 1:
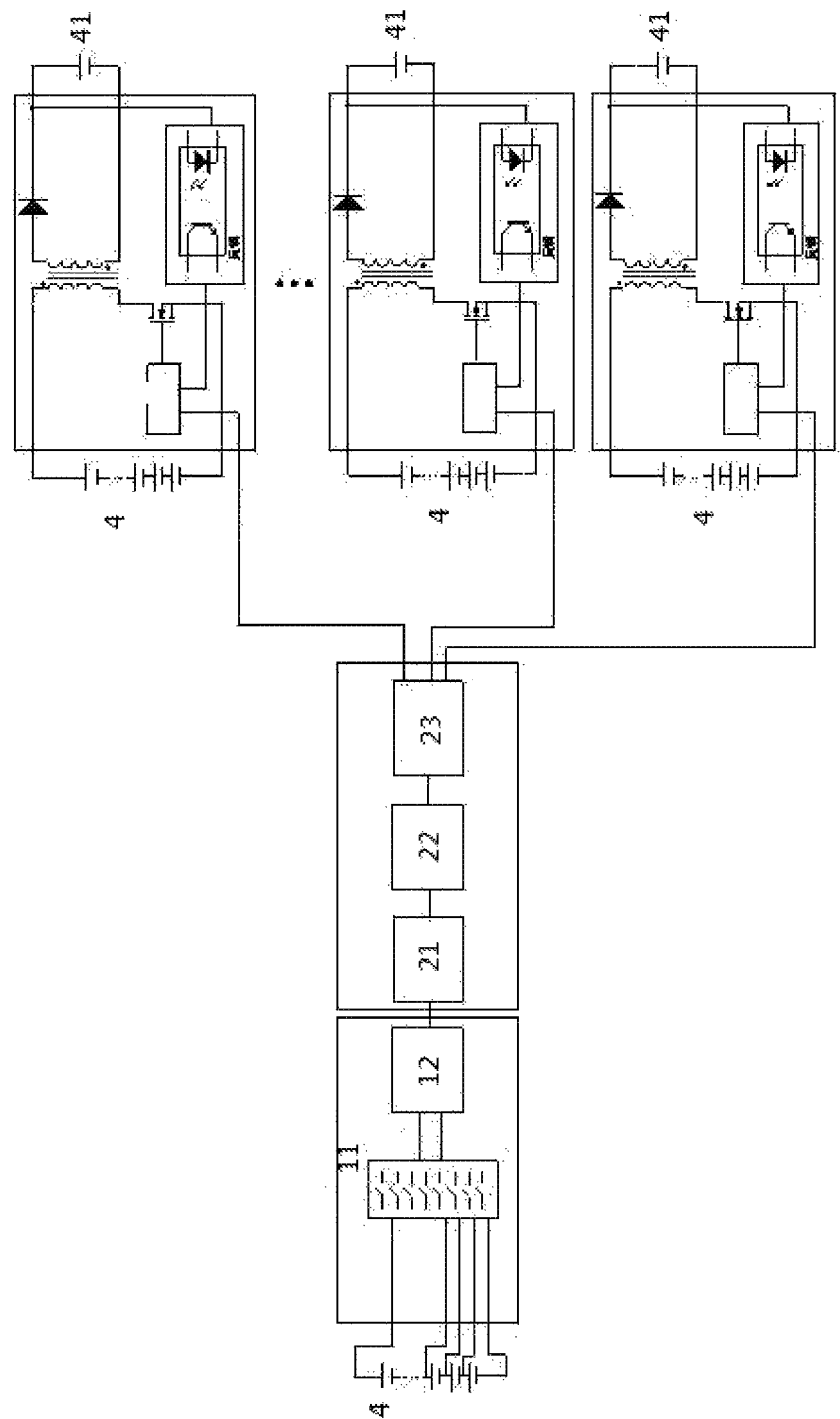
FIG. 1 is a structural simulated schematic view of an active charge equilibrium system for lithium battery pack of the creation.
Figure 2:
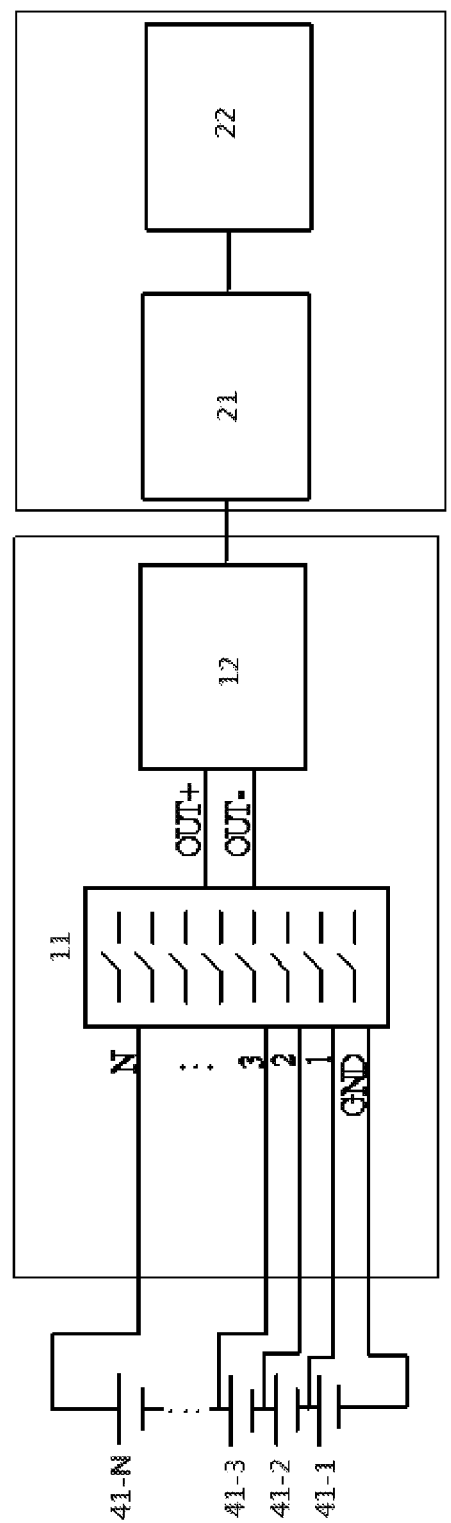
FIG. 2 is a a battery pack state monitoring simulated schematic view of an active charge equilibrium system for lithium battery pack of the creation.
Figure 3:
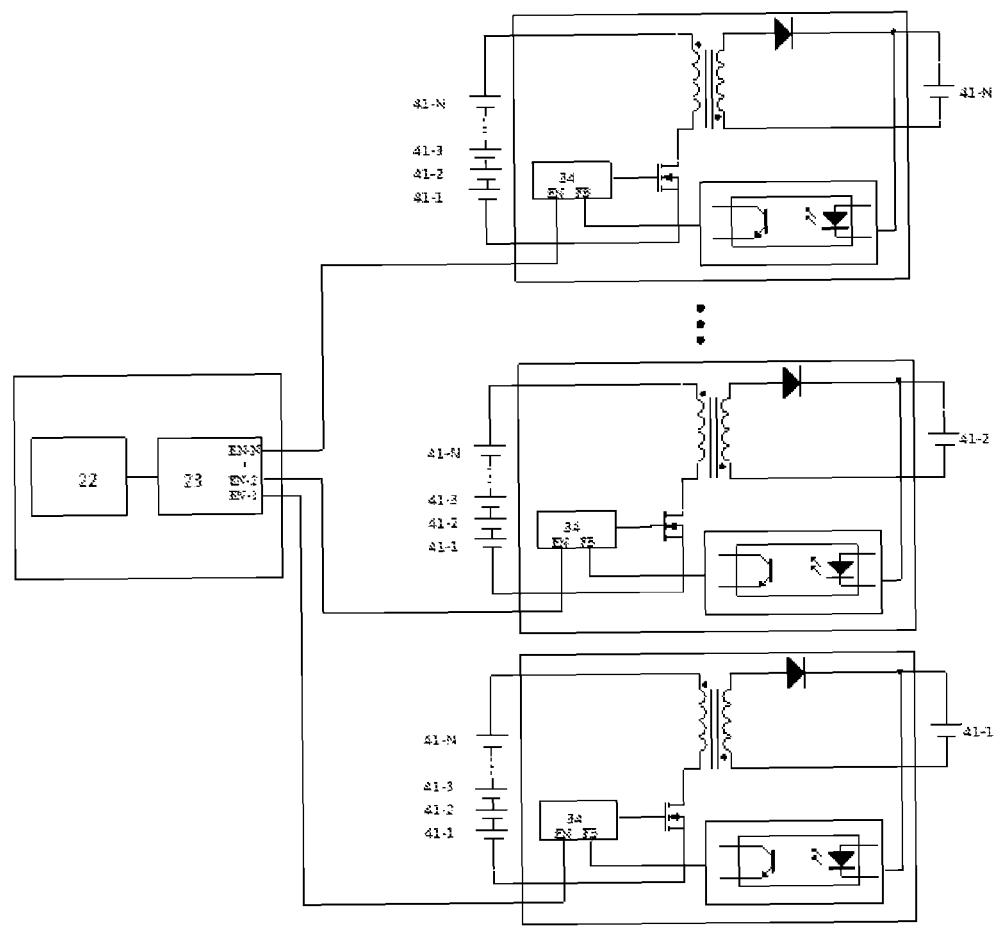
FIG. 3 is an equilibrium control state simulated schematic view of an active charge equilibrium system for lithium battery pack of the creation.
Figure 4:
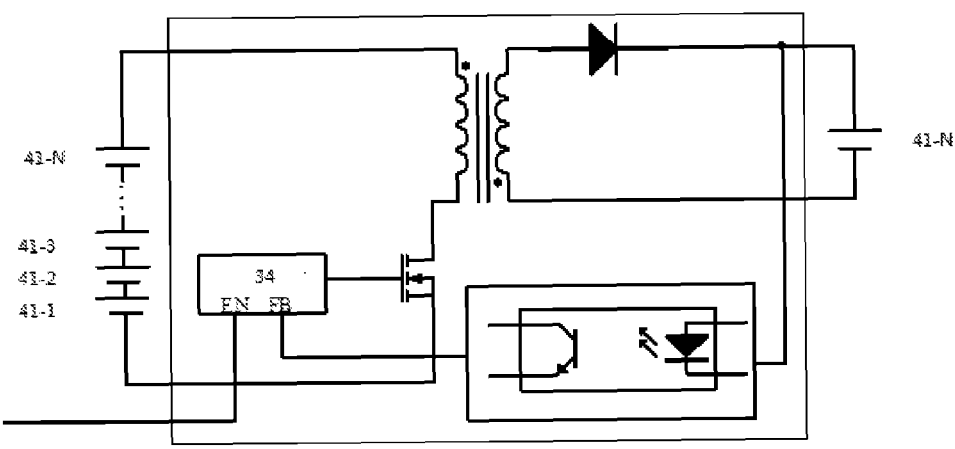
FIG. 4 is an equilibrium control module structural schematic view of an active charge equilibrium system for lithium battery pack of the creation.

Refer to FIGS. 1, 2, 3 and 4, the creation discloses an active charge equilibrium system for lithium battery pack, which is connected electrically to at least one lithium battery pack 4 for charging the lithium battery pack 4, which is composed of multiple cells 41 in series; to avoid overlap of wire connection, the lithium batteries 4 shown in FIGS. 1 to 4 are identical, and the multiple cells 41 (for example, cell 1, cell 2 . . . cell N) in FIGS. 1 to 4 are identical, too.

The active charge equilibrium system for lithium battery pack of the creation includes a multiplex module 1, a control module 2 and multiple equilibrium control modules 3.

The multiplex module 1 includes a multiplexer 11 and a differential amplifier 42. The positive and negative electrodes of said cells 41 are connected electrically with the multiplexer 11 sequentially, and the output of the multiplexer 11 is connected to the input of the differential amplifier 42.

The control module 2 includes a digital to analog converter 21 and a microcontroller 22, while the input of the digital to analog converter 21 is connected to the output of the differential amplifier 42, and the input of the microcontroller 22 is connected to the output of the digital to analog converter 21 such that the microcontroller 22 may receive the signal delivered by the digital to analog converter 21 and output a control signal 23.

The equilibrium control module 3 is electrically connected correspondingly to all cells 41, and the equilibrium control module 3 includes a transformer 31, a NMOS transistor 32, a signal feedback unit 33 and a pulse width modulator 34. The transformer 31 has a primary side coil 311 and a secondary side coil 312. A first circuit 36 is formed by connecting the primary side coil 311 of the transformer 31 and the NMOS transistor 32 with the lithium battery pack 4 in series sequentially. A second circuit 37 is formed by connecting the secondary side coil 312 with each of the corresponding cells 41 in series. One end of the signal feedback unit 33 is connected between the secondary side coil 312 of the transformer 31 and the corresponding cell 41, and another end thereof is connected to the pulse width modulator 34 to receive the output signal from the secondary side coil 312 of the transformer 31 and deliver to the pulse width modulator 34. The pulse width modulator 34 is further connected with the NMOS transistor 32 and connected with the microcontroller 22 of the control module 2 together such that the control signal 23 of the microcontroller 22 may control the conduction of the NMOS transistor 32 through the pulse width modulator 34.

Further, a diode 35 may be connected between the secondary side coil 312 of the transformer and the corresponding cell 41; and the NMOS transistor 32 has a drain 321, a source 322 and a gate 323, while the positive electrode of the lithium battery pack 4 is connected with one end of the primary side coil 311 of the transformer 31, the other end of the primary side coil 311 of the transformer 31 is connected with the drain 321 of the NMOS transistor 32; in addition, the source 322 of the NMOS transistor 32 is connected with the lithium battery pack 4; while the pulse width modulator 34 is connected with the gate 323 of the NMOS transistor 32.

Thus, the multiplexer 11 is controlled by the microcontroller 22 to connect all cells 41 in the lithium battery pack 4 to the input of the differential amplifier 42 sequentially; and for the differential amplifier 42 to adjust voltage signal of each cell 41, deliver to the digital to analog converter 21 followed by converting the voltage signal into a digital signal, finally send to the microcontroller 22; further, the microcontroller 22 compares voltages of all cell 41, selects the cell 41 with lower voltage; in the mean time, the controller 22 issues a controller signal 23 to enable the equilibrium control module 3 corresponding to the cell 41 with the lower voltage to work; and the equilibrium control module 3 forms the first circuit 36 through the sequential series connection of the primary side coil 311 of the transformer 31 and the NMOS transistor 32 with the lithium battery pack 4, and forms a second circuit 37 by connecting the secondary side coil 312 of the transformer 31 with each corresponding cell 41 in series, and through the signal feedback unit 33 its one end is connected between the secondary coil 312 of the transformer 31 and the corresponding cell 41, while its the other end is connected to the pulse width modulator 34 to receive the output signal of the secondary side coil 312 of the transformer 31 and deliver to the pulse width modulator 34, and further connected with its NMOS transistor 32 through the pulse width modulator 34, and connected with the microcontroller 22 of the control module 2 together, such that the control signal 23 of the microcontroller 22 may control conduction of the NMOS transistor 32 through the pulse width modulator 34; such that the pulse width modulator 34 adjusts the output pulse width according to the output current and voltage signal of the signal feedback unit 33 to control the output current and voltage to charge cells 41; while as the voltage of the cell 41 reaches a certain value, the controller 22 turns off said equilibrium control module 3. At the same time, the microcontroller 22 compares voltages of all cells 41 repeatedly to select the cell 41 with lower voltage, and follow the same procedure to charge the lower cell 41 until the voltage reaches a certain default value. As the cell 41 is in charging, the sequence of constant current first and constant voltage last is followed.

Therefore, the beneficial effects of the creation compared to existent technologies are: as a switch for selection, an NMOS switch circuit is based on MOSFET as a core, its service life is far longer than that of a relay, and the volume is smaller than a general relay, the cost is also lower; the NOS switch circuit has small driving current, small volume, the driving power of each switch is smaller than 0.1 W and is much small compared to the driving power of a general relay.

What is claimed is:

1. An active charge equilibrium system for lithium battery pack, connecting electrically to at least one lithium battery pack, said lithium battery pack being composed of multiple battery cells in series, while said active charge equilibrium system for lithium battery pack including:
   a multiplex module, including a multiplexer and a differential amplifier, positive and negative electrodes of said cells being connected electrically with said multiplexer sequentially, an output end of said multiplexer being connected to an input of said differential amplifier;
   a control module, including a digital to analog converter and a microcontroller, an input of said digital to analog converter being connected to the output of said differential amplifier, an input of said microcontroller being connected to the output of said digital to analog converter, and said microcontroller being capable of outputting a control signal;
   multiple equilibrium control modules, connecting electrically to the cells correspondingly, said equilibrium control module including a transformer, a NMOS transistor, a signal feedback unit and a pulse width modulator, said transformer having a primary side coil and a secondary side coil, said primary side coil of said transformer and said NMOS transistor being connected with said lithium battery pack in series sequentially to form a first circuit, said secondary side coil of said transformer being connecting with each of the corresponding cells in series to form a second circuit, one end of said signal feedback unit being connected between said secondary side coil of said transformer and the corresponding cell, and the other fend thereof is connected to said pulse width modulator to receive the output signal of said secondary side coil of said transformer and deliver to said pulse width modulator, said pulse width modulator being further connected with its NMOS transistor, and being connected with the microcontroller of said control module, such that the control signal of said microcontroller being capable of controlling conduction of said NMOS transistor through said pulse width modulator.

2. The active charge equilibrium system for lithium battery pack as recited in claim 1, wherein a diode is capable of being connected between the secondary side coil of said transformer and the corresponding cell.

3. The active charge equilibrium system for lithium battery pack as recited in claim 1, wherein said NMOS transistor has a drain, a source and a gate, and the positive and negative electrodes of said lithium battery pack are connected with one end of the primary side coil of said transformer, the other end of the primary side coil of said transformer is connected with the drain of said NMOS transistor, while the source of said NMOS is connected with the negative electrode of said lithium battery pack, and said pulse width modulator and the gate of said NMOS transistor is connected.

* * * * *